United States Patent [19]

Dickey

[11] Patent Number: 4,769,656

[45] Date of Patent: Sep. 6, 1988

[54] EXPANSION BAND ANTENNA FOR A WRIST INSTRUMENT AND METHOD OF MAKING IT

[75] Inventor: Donald K. Dickey, West Hartford, Conn.

[73] Assignee: Timex Corporation, Middlebury, Conn.

[21] Appl. No.: 7,542

[22] Filed: Jan. 28, 1987

[51] Int. Cl.⁴ .......................... H01G 1/14; H04B 1/08

[52] U.S. Cl. .................................... 343/718; 224/175; 455/351

[58] Field of Search ......................... 343/718; 224/175; 455/347, 348, 351

[56] References Cited

U.S. PATENT DOCUMENTS

| | | | |
|---|---|---|---|
| 2,255,897 | 9/1941 | Rebori et al. | 343/718 |
| 2,899,549 | 8/1959 | Potter | 455/347 |
| 3,063,058 | 11/1962 | Vollet | 224/175 |
| 3,136,139 | 6/1964 | Sinner | 224/175 |
| 4,648,130 | 3/1987 | Kuznetz | 455/351 |

*Primary Examiner*—William L. Sikes
*Assistant Examiner*—Doris J. Johnson
*Attorney, Agent, or Firm*—William C. Crutcher

[57] ABSTRACT

An antenna for a wrist transmitter or receiver carried in a wrist instrument is made of a wire mesh enclosed in an elastic fabric sleeve. The antenna wire is composed of a tubular mesh of individual copper conductors which are loosely woven, twisted, or braided in such a way as to permit lateral expansion and also to assume a flat configuration. In a preferred form of the invention, the wire is woven in a manner similar to that of a coaxial cable outer shield conductor. The method of making the expansion band antenna consists of inserting an unexpanded wire mesh within a stretchable elastic fabric sleeve, expanding the mesh within the sleeve, and then flattening the sleeve and wire mesh. The wire mesh may be expanded within the sleeve by allowing a stretched sleeve to relax while holding the unexpanded mesh within it, or it may be expanded laterally within the sleeve by a mechanical or pneumatic tool.

10 Claims, 2 Drawing Sheets

EXPANSION BAND ANTENNA FOR A WRIST INSTRUMENT AND METHOD OF MAKING IT

BACKGROUND OF THE INVENTION

This invention relates to an antenna construction for a radio transmitter or receiver to be carried on the wrist, and more particularly relates to an expansion band antenna for a wristwatch radio device.

Several proposals are known for antennas for small portable radios in which the antenna is incorporated into a belt or strap which also supports the radio on the person of the user. Examples of these are shown in U.S. Pat. No. 2,470,687 issued to Cafrella et al. on May 17, 1949, U.S. Pat. No. 3,523,296 issued to Vliegenthardt on Aug. 4, 1970, U.S. Pat. No. 2,255,897 to Rebori et al. on Sept. 16, 1941, and U.S. Pat. No. 4,340,972 issued to Heist on July 20, 1982. The Heist and Vliegenthardt patents depict antennas designed to function as conventional dipoles. The Cafrella et al. patent shows a loop antenna stitched between two plies of a supporting belt, and the Rebori patent depicts a loop antenna with a parallel connected tuning capacitor and coupled to a crystal "detector."

Proposals are also known for combining a radio transmitter or receiver with a timepiece and arranging the antenna for the transmitter or receiver inside two separate halves of a wristband, the conductors in each half being connected to the radio device inside the timepiece case. An example is shown in U.S. Pat. No. 3,032,651 to Gisiger-Stahli et al. on May 1, 1962 having serpentine conductors folded back and forth longitudinally along the halves. Another proposal appears in published European patent application No. 0 100 639 A2 published Feb. 15, 1984 in the name of Sinclair Research Limited. A continuous watchband is shown with transversely oriented loops strung on a pair of conductors running longitudinally and embedded in the watchband, the separate loops being wound on ferrite cores.

A proposal for a wristwatch receiver antenna is disclosed in PCT application, Internation Publication No. WO 86/03645 published June 19, 1986 in the name of AT&E Corporation, in which the watchband comprises two sections of a strip conductor within a strap fastened by a conductive clasp or buckle. This construction requires special grommets on one side to make connection with the tongue of the buckle on the other side or use of a conductive clasp. Such proposals introduce the possibility of electrical discontinuities the midpoint of the antenna. An alternate proposal in the aforesaid application was to zig-zag a conductor through successive links of a metal expansion band, a tedious and expensive procedure.

Normally an antenna is designed in an effort to attain ideal physical dimensions corresponding to half of a wave length, or dipole. However, a wristwatch antenna is unable to achieve an effective length corresponding to an ideal dipole and is thus obliged to transfer energy within the constraints of the physical size of the wrist instrument. If the antenna is small, the greatest power transfer to a circuit requires impedance matching with a resonant tuned antenna circuit. The theory of small antennas is set forth in *Small Antennas* by Harold A. Wheeler published in IEEE Transactions and Antennas and Propogation, volume AP-23, No. 4, July 1975 and also in an article entitled "Loop Antennas" by Glenn S. Smith, pages 5-2 through 5-9 appearing in *Antenna Engineering Handbook,* Second Edition, published by McGraw Hill, 1984. As shown in these articles, when the greatest antenna dimension is less than one-quarter wave length, and typically much smaller than that, a small loop antenna is analyzed as a radiating inductor, with impedance matching required to achieve the best power transfer. The greatest physical dimension of a wrist instrument is the diameter of the strap or band, which practically can be no greater than around 7.5 cm. For example, for transmission or reception at 40 MHz (wave length of approximately 7.5 meters), a wristwatch antenna is no larger than approximately 0.01 times the wave length at this frequency.

One of the requirements for a wrist instrument is to be able to get the instrument off and on the wrist. This either requires a buckle or clasp, or an expansion band. An expansion band allows a continuous conductor without electrical discontinuities which might degrade its performance as an antenna. However, an expansion band must also be flexible and able to expand and contract without breaking or affecting the performance of the antenna wire associated with it.

Accordingly, one object of the present invention is to provide an improved expansion band antenna for a wristwatch transmitter/receiver.

Another object of the invention is to provide an improved antenna for a wrist instrument having stretchable and flexible qualities.

Another object of the invention is to provide an improved method of making an expansion band antenna.

SUMMARY OF THE INVENTION

Briefly stated, the invention comprises an expansion band antenna for attachment to a wrist instrument comprising a continuous multistrand wire mesh member disposed within a strap member comprising an elastic fabric sleeve. The wire mesh member is composed of individually insulated copper strands which are woven, twisted, knit, or braided in such a way as to permit lateral expansion, preferably a stranded tube woven helically in the same manner as a shield conductor for a coaxial cable. The wire mesh member is placed inside the elastic fabric sleeve and expanded laterally into the sleeve. One of the ends of the wire mesh may then be provided with connections for the wrist instrument connection to ground, and the other end is connected to a radio device within the wrist instrument, to form a small loop antenna.

DRAWING

Other objects and advantages of the invention will be more clearly understood by reference to the following description taken in connection with the accompanying drawing, in which:

FIG. 1 is a perspective assembly drawing showing a back view of the wrist instrument and expansion band, with portions of the latter removed, FIG. 2 is a simplified electrical circuit diagram of the antenna of FIG. 1, FIG. 3 is an enlarged perspective view of a preferred tubular wire mesh member, FIGS. 4 through 6 are perspective schematic views in simplified form illustrating first, second, and third steps respectively in a process for making the antenna in FIG. 1, and FIGS. 7 and 8 are schematic end views in simplified form illustrating first and second steps respectively in a modification of the process for making the antenna of FIG. 1

DESCRIPTION OF THE PREFERRED EMBODIMENT

Referring now to FIG. 1 of the drawing, the perspective view illustrates component parts of a preferred form of the invention. Shown generally at 1 is a wrist instrument in the form of a wristwatch bezel having, in addition to the usual timekeeping elements, a radio device for sending and/or receiving radio frequency signals to and from the wrist instrument. By way of example, and not intended to be limiting in the invention claimed, the present application contemplates an FM radio transmitter operating at a frequency of approximately 40 MHz and transmitting a coded signal by modulating the carrier wave with frequency shift keying in accordance with a prescribed protocol, in order to actuate an emergency or security device at some distance from the wrist instrument. The invention is equally applicable as an antenna for a radio receiver, such as found in paging devices, and therefore, the phrase radio device used herein means radio receiver, radio transmitter, or transceiver. The invention is also applicable to an antenna suitable for a frequency spectrum generally comprising the HF, VHF and portions of the UHF band ranging from 3 MHz to 1 GHZ having respective wave lengths of 100 to 0.3 m. Wrist instrument 1 includes a metal bezel 2 acting as a ground connection and is arranged to be attached on either side to molded strap ends 3, 4. The strap ends incorporate the ground connection clips 8, 9, which are attached to the bezel with screws.

In accordance with the present invention, the expansion band antenna employs an elastic fabric strap member 5 shown in FIG. 1 as consisting of a single sleeve of elastic fabric. Sleeve 5 is preferably a braided elastic fabric sleeve of elastomeric fibers, which are interspersed in a known manner with polyester fibers. The braided elastic fabric tube 5 may be stretched to act as an expansion band. However, the elastic fabric sleeve may be formed in other known ways such as by braiding, weaving, or kniting elastomeric fibers, either with or without cotton, wool, or synthetic fibers, such as nylon, polyester, or rayon in a manner known to those skilled in the textile art. The only requirement for elastic fabric sleeve 5 is that it be stretchable without permanent distortion, preferably of electrically insulating material, pleasing in appearance, and resistant to wear so that it will serve as an expansion band for a wrist instrument.

Inside sleeve 5 is a continuous length of antenna wire mesh 7. The ends of the wire member terminate at the respective ends of the strap member, which together make up an expansion band antenna 11. The strands are arranged within the sleeve so that when the elastic fabric is streched, they will flex and allow the mesh to become longer along with the elastic fabric to permit the band to pass over the hand of the wearer of the wrist instrument without damaging or breaking the wire.

It has been found that preferred electromagnetic characteristics, as well as increased wire flexibility are achieved by utilizing a multistrand wire mesh of individually insulated copper strands. The optimum number of strands depends upon the desired flexibility and is also determined by the shape and manner of arranging the strands. Satisfactory results have been achieved with 16 strands of 28 gauge wire and with 150 strands of 38 gauge wire. However, depending upon the frequency of the radio signal and the other factors enumerated above, the wrist antenna wire is useful over a range from around 8 strands to as many as 400 strands of wire. As is known in the art, high frequency A-C current flows on the outer surface of the strands due to "skin effect." Therefore, increasing the number of strands for the same copper cross sectional area increases the "skin" surface area and hence lowers the resistance to current flow. The described antenna is largely inductive. Stranding the antenna wire adds capacitance, and reduces the external capacitance needed to tune the antenna.

Ground connecting clips 8, 9 and a capacitor 10 are shown for making the necessary connections between the ends of the antenna wire and the wrist instrument 1. These are molded into plastic and attachments shown in phantom lines as 3 and 4.

In FIG. 1 of the drawing, wrist instrument 1 is shown from the back attached to the assembled expansion band antenna 11. One end of the antenna wire 7 is connected to ground on the back of the watchcase using grounding clip 8. The other end of antenna wire 7 branches. One branch is connected to capacitor 10 which, in turn, is connected to the wrist instrument case by grounding clip 9. The other branch, indicated at 12 is the signal lead and is insulated and conducted to the interior of the wrist instrument, where it is attached to the signal output or input of a radio device, here a transmitter 13.

Reference to FIG. 2 shows the electrical schematic diagram, wherein 7' is the antenna wire, 10' is the parallel-connected capacitance of capacitor 10 and 12' is the signal lead from the radio device. The effective diameter of the antenna loop 7', designated "d" is normally less than 1/100 of the transmitted wave length. Therefore, the antenna acts as an electrically small loop and must be tuned to become a parallel resonant circuit by proper selection of capacitor 10 in order to match the inductive properties of the stranded antenna loop. Although one end of the antenna is grounded in the arrangement of FIGS. 1 and 2, grounding is not a material factor in the present invention.

Referring now to FIG. 3 of the drawing, reference numeral 5 designates a multistrand conductor 7 comprising individually insulated strands which are woven, braided, or twisted in such a manner to permit lateral expansion (with consequent shortening of its length). An example of such a conductor, which gives excellent results in practice is one with strands loosely interwoven in the same manner as a shield for a coaxial cable, but with the strands individually insulated. One such multistrand shield comprises 16 groups of 6 strands each. Eight of the groups, one being shown as *7a*, are wound in a helical pattern clockwise (going from left to right) and the other eight groups, one being shown as *7b*, are wound in a helical pattern counter-clockwise and being interwoven loosely among the first eight groups. Such a construction may be laterally expanded by forcing it to become shorter in a longitudinal direction, ie. along the axis of the helix. Other wire mesh arrangements are also possible, such as a loosely woven, twisted, or even a loosely assembled bundle of strands.

METHOD OF MANUFACTURE

FIG. 4 illustrates elastic sleeve 5 in a stretched condition with the unstretched conductor 7 passing through it. This may be done either by first stretching the sleeve and then inserting the conductor, or it may be done by stretching the sleeve around an already inserted conductor.

FIG. 5 illustrates a next step wherein the sleeve is pinched at axially spaced locations A, B on the the conductor and held while the sleeve is allowed to relax to an unstretched configuration. As it contracts, the braided conductor mesh expands laterally in diameter into the interior of sleeve 5, due to the longitudinal shortening of on the conductor.

Figure 1:
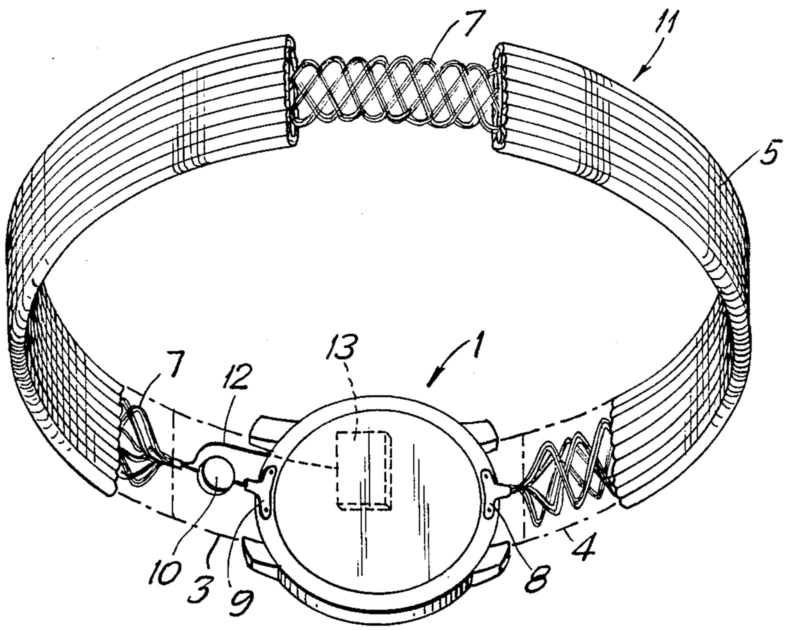
Figure 2:
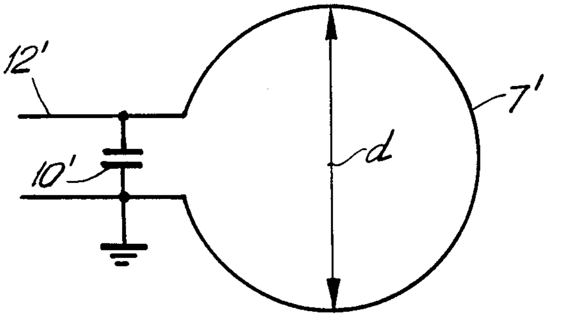
Figure 3:
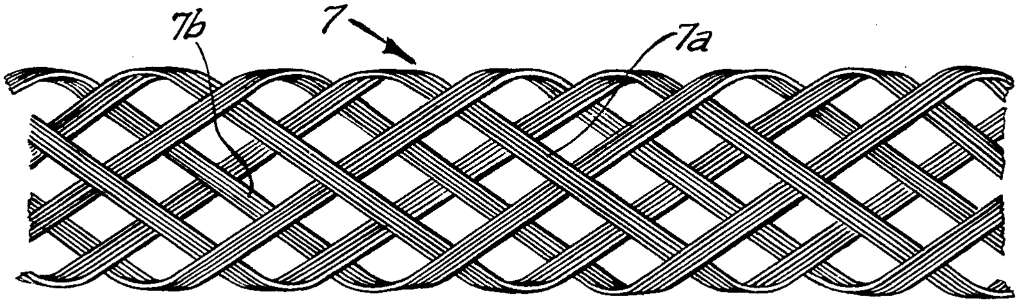
Figure 4:
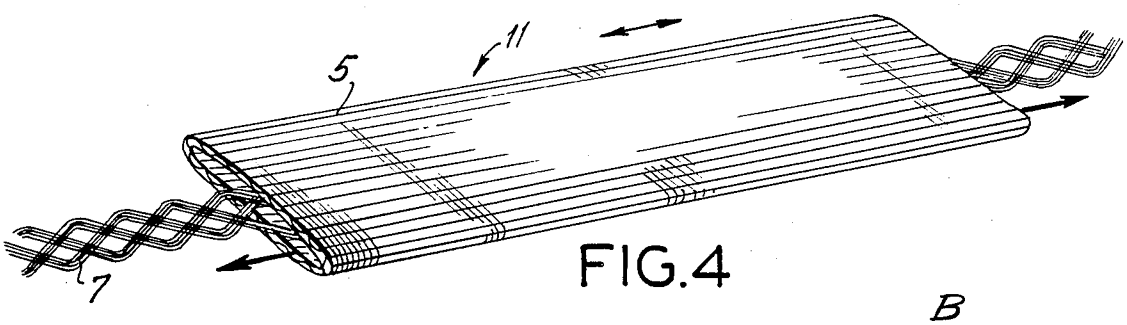
FIGS. 4–6 illustrate one modification of the method step of laterally expanding the conductor within the sleeve.
Figure 5:
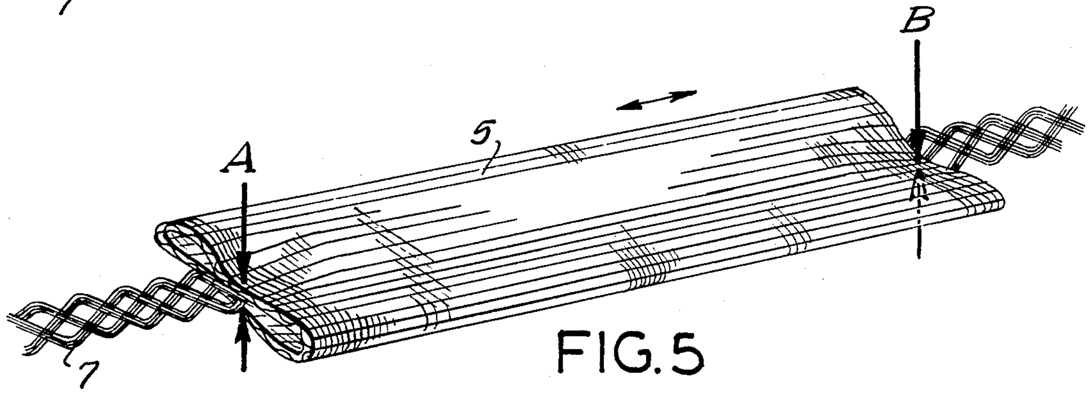
Figure 6:
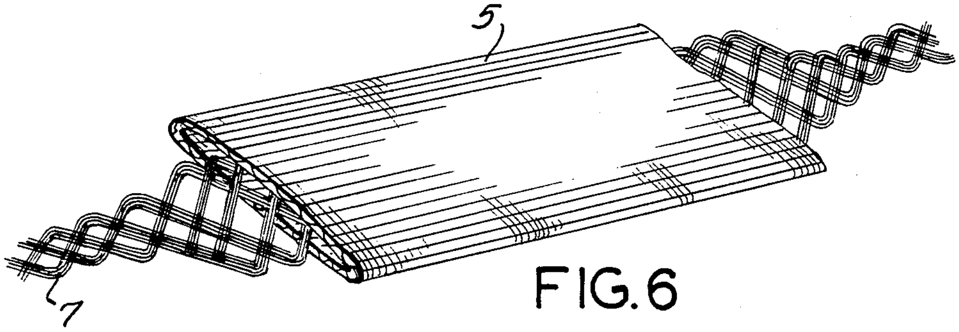

FIG. 6 illustrates the expanded conductor wire mesh disposed inside the sleeve 5, both now in a relaxed state. Sleeve 5 and conductor 7 are now together flattened, manually or by a machine pressing operation. Electrical connectors are attached to the ends of the wire mesh conductor and end attachment members 3, 4 are molded around the ends of the wristband antenna to hold the electrical conductors in place. The attachment members are then fastened to the wrist instrument 1 in a conventional manner and the electrical connections made as shown in FIG. 1.

Figure 7:
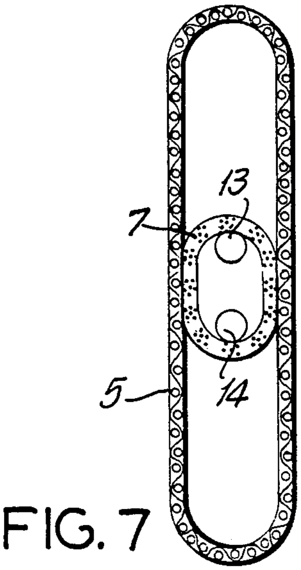
Figure 8:
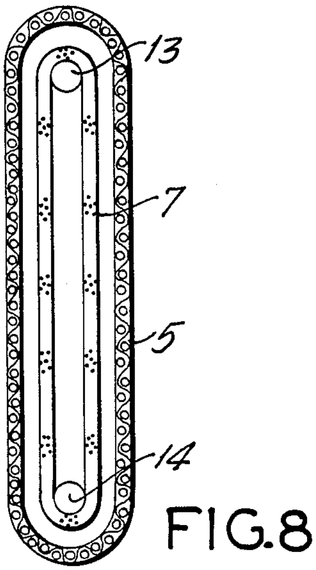

FIGS. 7 and 8 illustrate another modification of the method step of laterally expanding the conductor within the sleeve.

FIG. 7 illustrates elastic fabric sleeve 5 with the wire mesh conductor 7 placed inside. Neither has been stretched. A tool having two separable fingers 13, 14 is placed inside the wire mesh conductor, either before or after inserting the conductor into the sleeve FIG. 8 illustrates fingers 13, 14 forced apart by the tool, which may be manually, electrically, hydraulically, or pneumatically operated. This laterally expands the conductor mesh inside the sleeve. Subsequently fingers 13, 14 are returned to the position shown in FIG. 7, and are withdrawn, leaving the mesh of strands expanded to fill sleeve 7, which is then flattened as before.

While there has been described what is considered to be the preferred embodiment of the invention other modifications will occur to those skilled in the art and it is desired to secure in the appended claims all such modifications as fall within the true spirit and scope of the invention.

I claim:

1. An expansion band antenna for a wrist instrument having a ground connection and incorporating a radio device therein operating within a preselected frequency band, comprising:
- an elastic strap member comprising a sleeve adapted to be attached at either end thereof to said wrist instrument to hold it in place and stretchable to pass over the hand of the wearer,
- a continuous wire member comprising a multistrand mesh of individually insulated conductive strands loosely arranged in such a way as to permit lateral expansion, said wire member being expanded laterally within said strap member, and
- connection means connected to said wire member for electrically connecting at least one end of said wire member to said radio device.

2. The combination according to claim 1, wherein said wire member strands are loosely interwoven in the manner of a stranded coaxial cable shield conductor and wherein the other end of the wire member is connected to said ground connection to provide a loop.

3. The combination according to claim 1 wherein said wire member strands are divided into a plurality of groups of strands, a first half of said groups being formed helically clockwise and a second half of said groups being formed helically counter clockwise and interwoven among said first groups.

4. The combination according to claim 1, wherein said elastic strap member is a fabric sleeve comprising elastomeric fibers.

5. The combination according to claim 4 where the sleeve is braided and further comprises synthetic fibers braided among said elastomeric fibers.

6. Method of making an expansion band antenna for a wrist instrument having a ground connection and incorporating a radio device therein operating within a preselected frequency band, comprising:
- providing an elastic strap member comprising a sleeve adapted to be attached at either end thereof to said wrist instrument to hold it in place and stretchable to pass over the hand of the wearer,
- inserting into said sleeve a continuous wire member comprising a multistrand mesh of individually insulated conductive strands loosely arranged in such a way as to permit lateral expansion,
- expanding said continuous wire member laterally within said elastic strap member, and
- attaching connections to said continuous wire member for electrically connecting at least one end of said continuous wire member to said radio device.

7. The method of claim 5, wherein said wire member strands are loosely interwoven in the manner of a stranded coaxial cable shield conductor, and including the step of attaching the other end of the wire member to said ground connection.

8. The method of claim 6, wherein said expanding step comprises:
- clamping the opposite ends of a stretched sleeve and an unstretched wire member within said sleeve, and allowing said sleeve to relax while said ends are clamped.

9. The method of claim 5, wherein said expanding step comprises:
- placing said wire member within said sleeve and laterally separating said strands while the wire member is inside the sleeve.

10. The method according to claim 6 including the further step of flattening said sleeve and said laterally expanded wire member.

* * * * *